(12) United States Patent
Pryor

(10) Patent No.: US 6,230,466 B1
(45) Date of Patent: May 15, 2001

(54) WRAP AROUND HANGER

(75) Inventor: Steven E. Pryor, Dublin, CA (US)

(73) Assignee: Simpson Strong-Tie Company, Inc., Dublin, CA (US)

( * ) Notice: Subject to any disclaimer, the term of this patent is extended or adjusted under 35 U.S.C. 154(b) by 0 days.

(21) Appl. No.: 09/170,685

(22) Filed: Oct. 13, 1998

(51) Int. Cl.[7] ....................................... E04B 1/38
(52) U.S. Cl. .......................... 52/702; 52/712; 52/656.9; 52/289; 403/231; 403/232.1
(58) Field of Search ............... 52/702, 713, 712, 52/715, 643, 656.9, 289; 403/231, 232.1, 403

(56) References Cited

U.S. PATENT DOCUMENTS

| | | | |
|---|---|---|---|
| D. 355,349 | * 2/1995 | Taparauskas, Jr. | D8/349 |
| 974,606 | * 11/1910 | Schrader | 403/403 X |
| 1,785,791 | * 12/1930 | Ropp | 52/702 |
| 1,807,186 | * 5/1931 | Warner | 403/172 |
| 2,700,457 | * 1/1955 | Munroe | 403/187 X |
| 2,911,690 | 11/1959 | Sanford . | |
| 3,036,347 | 5/1962 | Findleton . | |
| 3,972,169 | * 8/1976 | Sheppard, Jr. | 52/702 |
| 4,422,792 | * 12/1983 | Gilb | 52/702 X |
| 4,525,972 | * 7/1985 | Palacio et al. | 52/702 X |
| 4,572,695 | * 2/1986 | Gilb | 52/702 X |
| 4,649,688 | * 3/1987 | Mosier | 403/231 X |
| 4,713,923 | * 12/1987 | Sielaff et al. | 52/702 X |
| 4,717,279 | 1/1988 | Commins . | |
| 4,890,436 | 1/1990 | Colonias . | |
| 4,893,961 | 1/1990 | O'Sullivan et al. . | |
| 4,920,725 | 5/1990 | Gore . | |
| 5,324,132 | * 6/1994 | Hunter et al. | 52/702 X |
| 5,341,619 | 8/1994 | Dunagan et al. . | |
| 5,845,453 | * 12/1998 | Goya | 52/656.9 X |
| 5,857,306 | * 1/1999 | Pellock | 52/643 |

FOREIGN PATENT DOCUMENTS

185694 * 9/1922 (GB) .................................. 403/232.1

OTHER PUBLICATIONS

Maher, Arthur, "Engineered Nailing Simplifies Framing", Popular Mechanics, pp. 137–140, Aug. 1964.*

* cited by examiner

Primary Examiner—Laura A. Callo
(74) Attorney, Agent, or Firm—James R. Cypher; Charles R. Cypher

(57) ABSTRACT

A hanger for connecting a held member to a holding member the hanger having a connection member for holding the held member, a back member which connects to the holding member and a unique connection flange which is used to strengthen the connection to the holding member. The connection flange can either wrap around or under the holding member, and in the preferred embodiment it wraps around the holding member to the side opposite the back member of the hanger. This allows each of the fasteners that connect the hanger to the holding member to be received by the hanger at two points, which better distributes the load throughout the holding member.

24 Claims, 16 Drawing Sheets

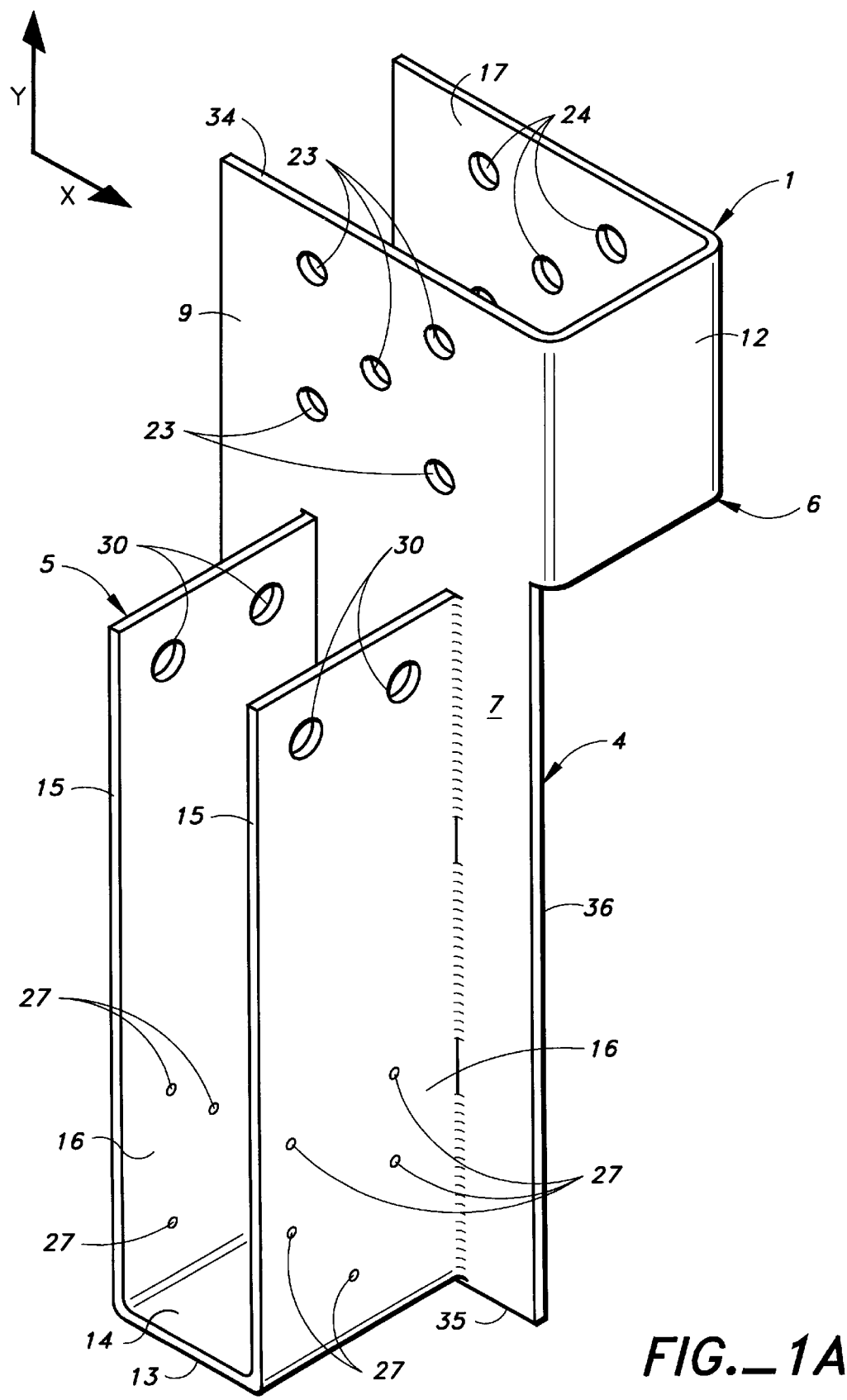
FIG._1A

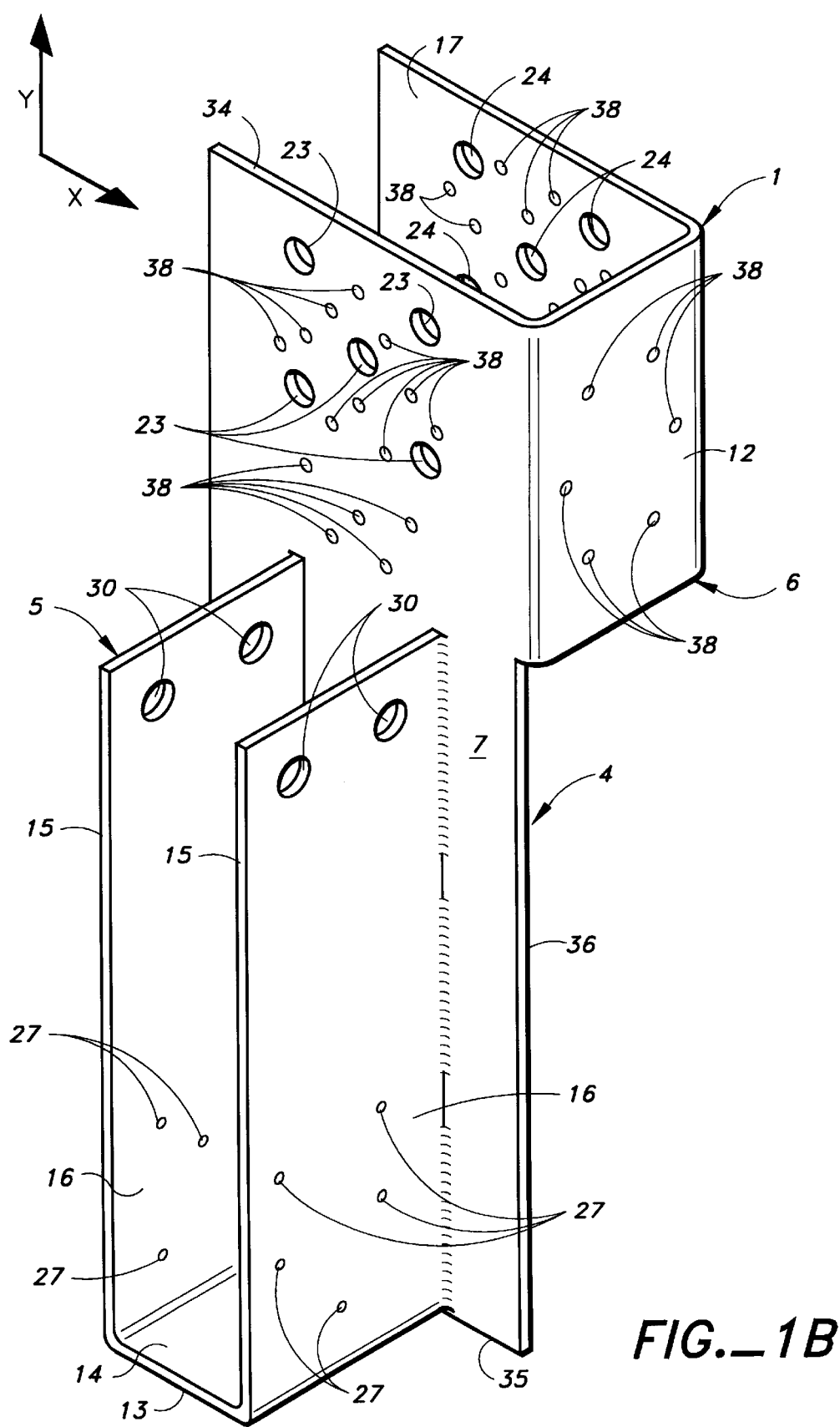
FIG._1B

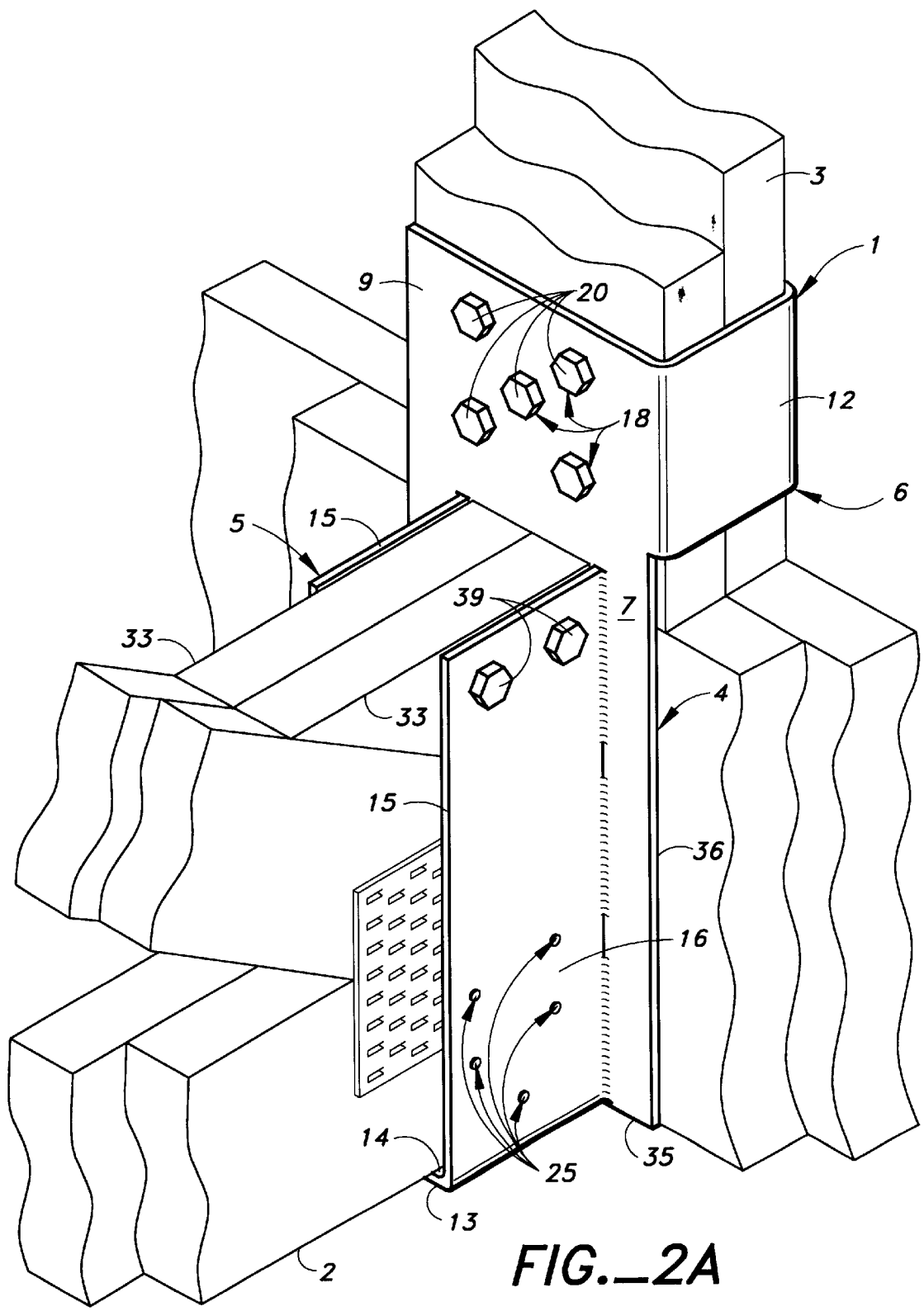
FIG._2A

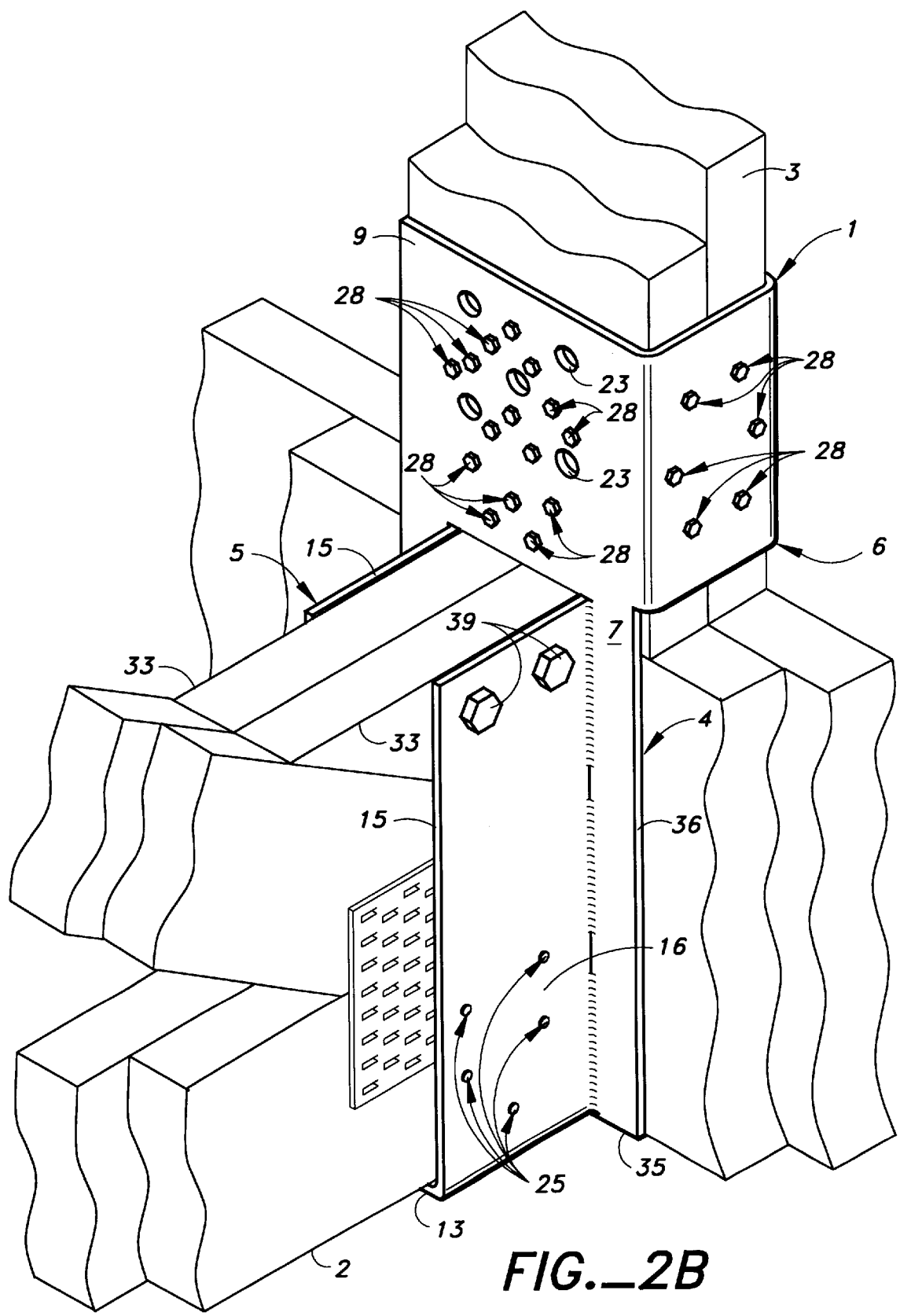
FIG._2B

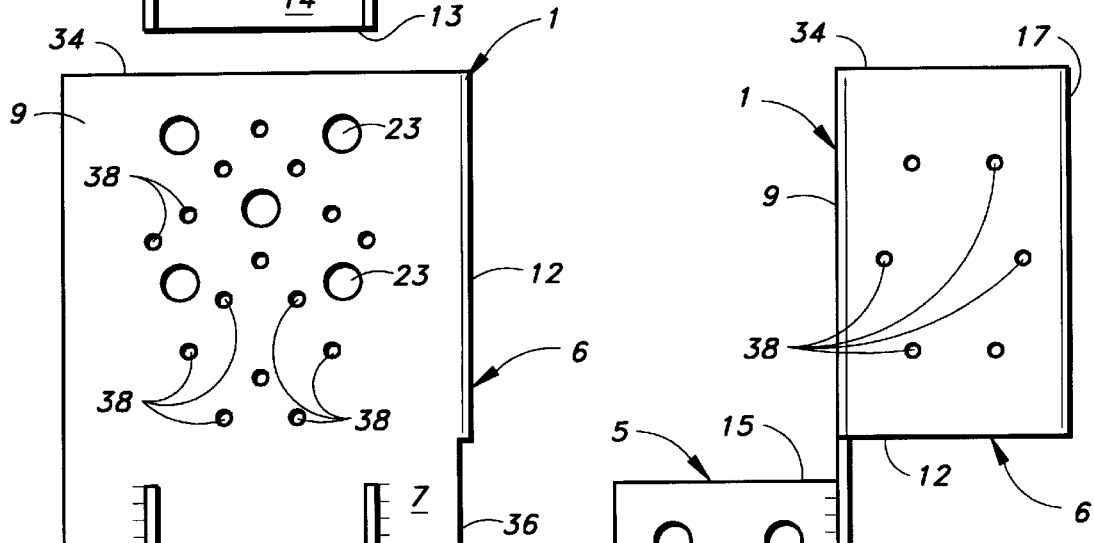
FIG._3
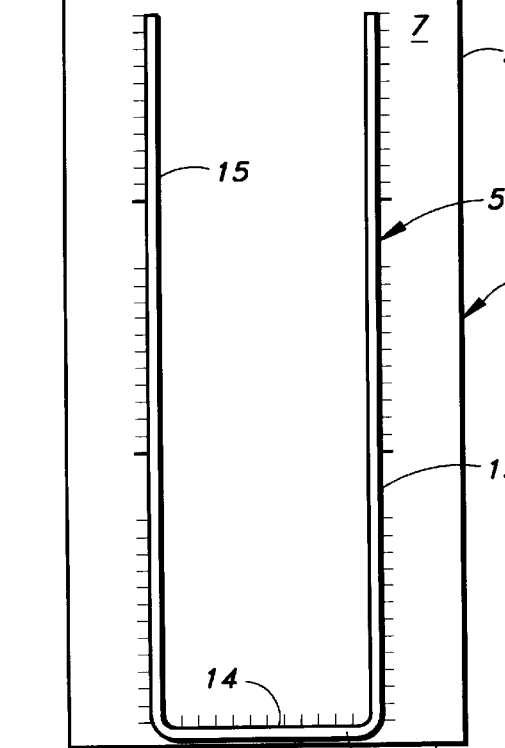
FIG._4
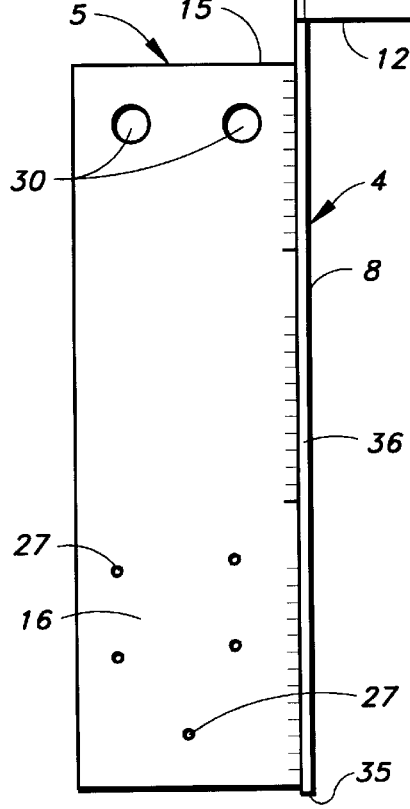
FIG._5

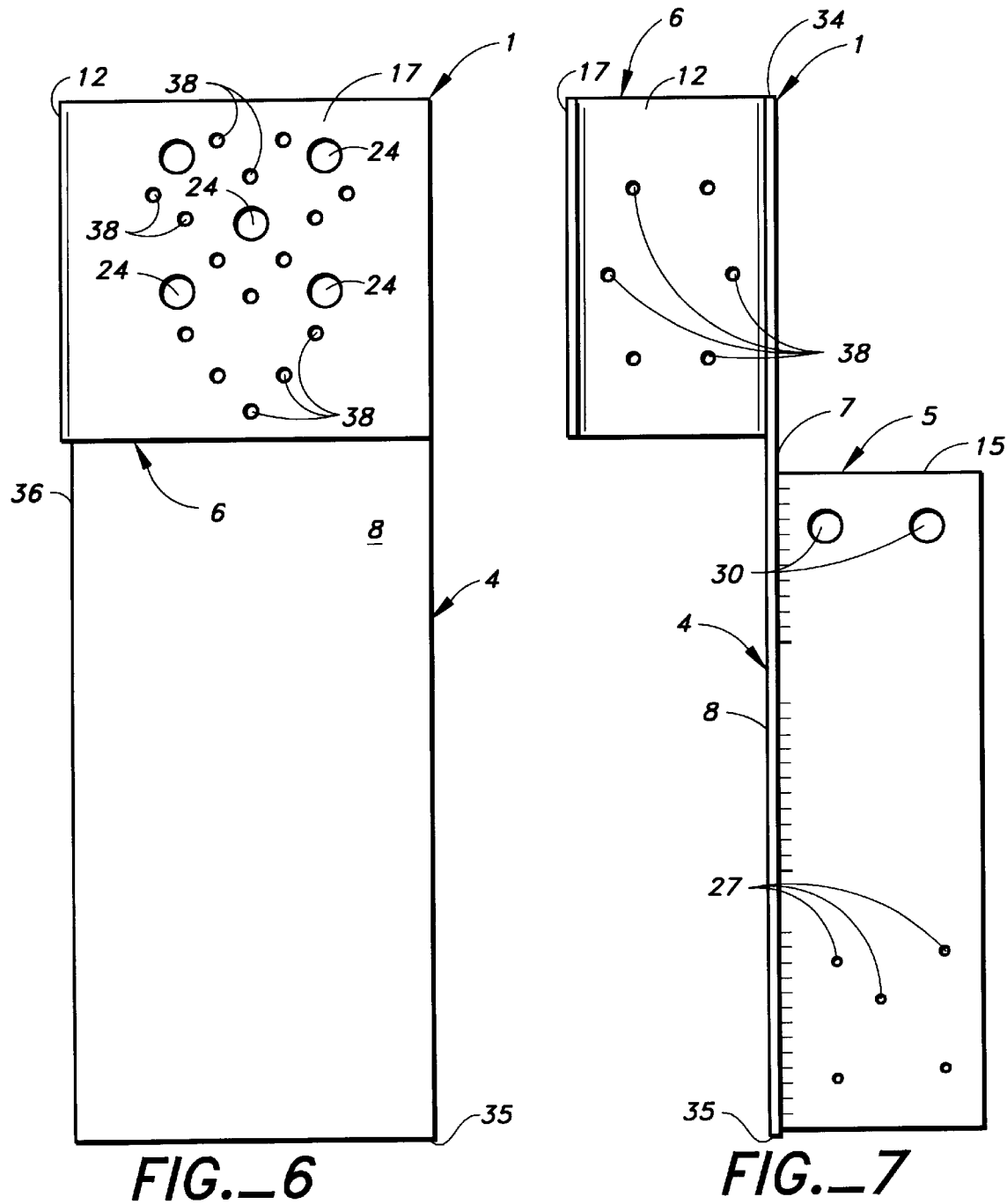

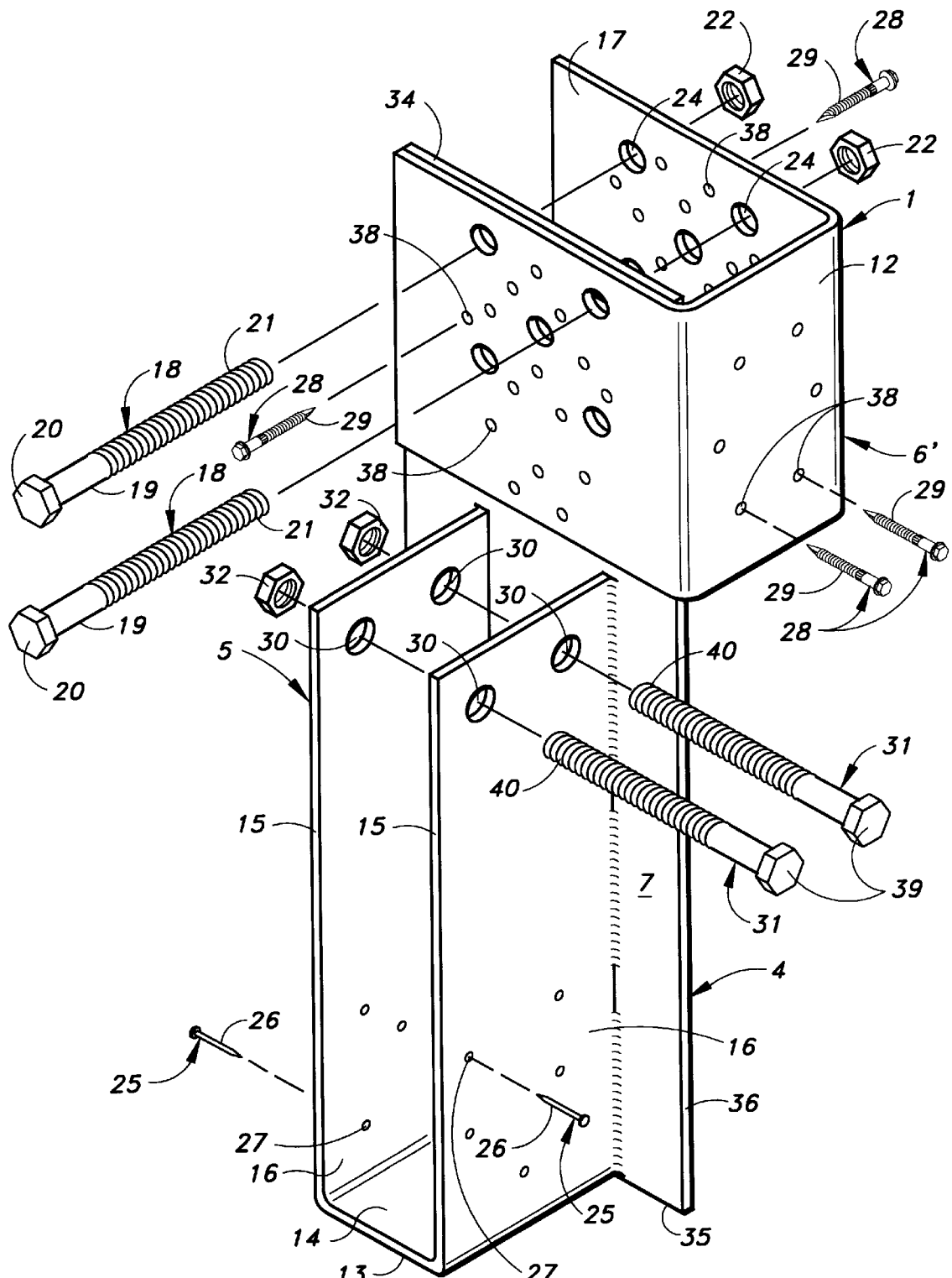
FIG._8

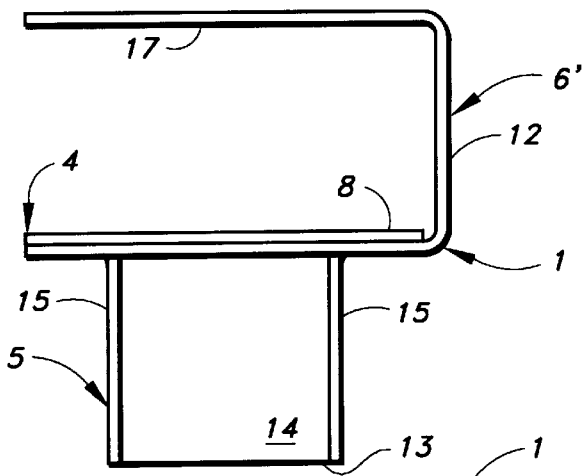
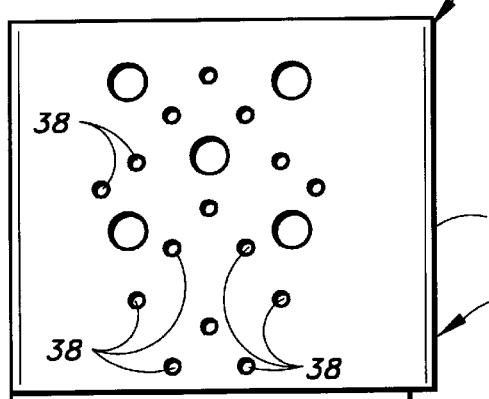
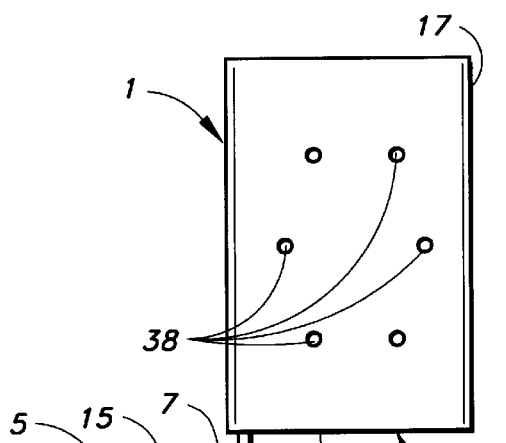
FIG._9
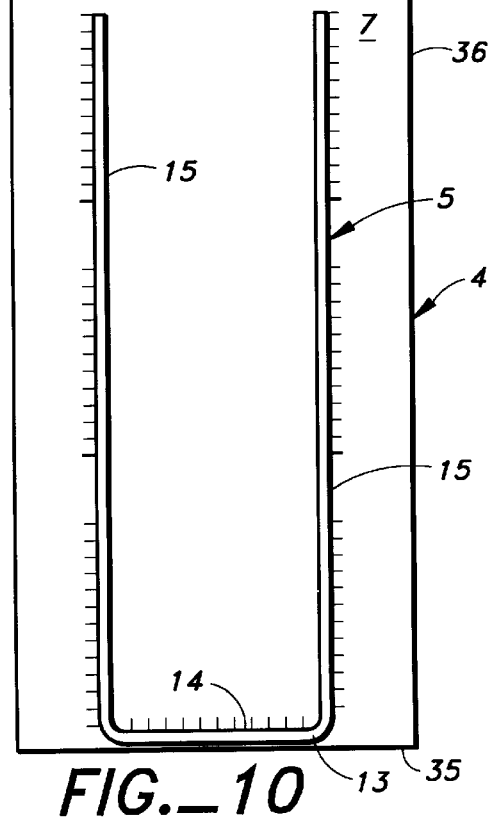
FIG._10
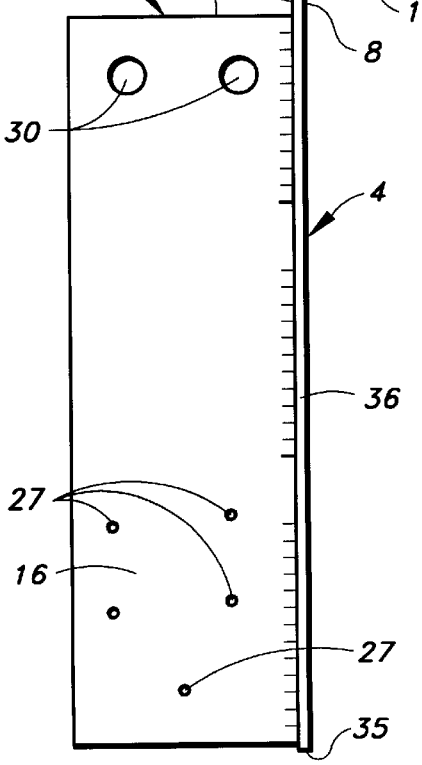
FIG._11

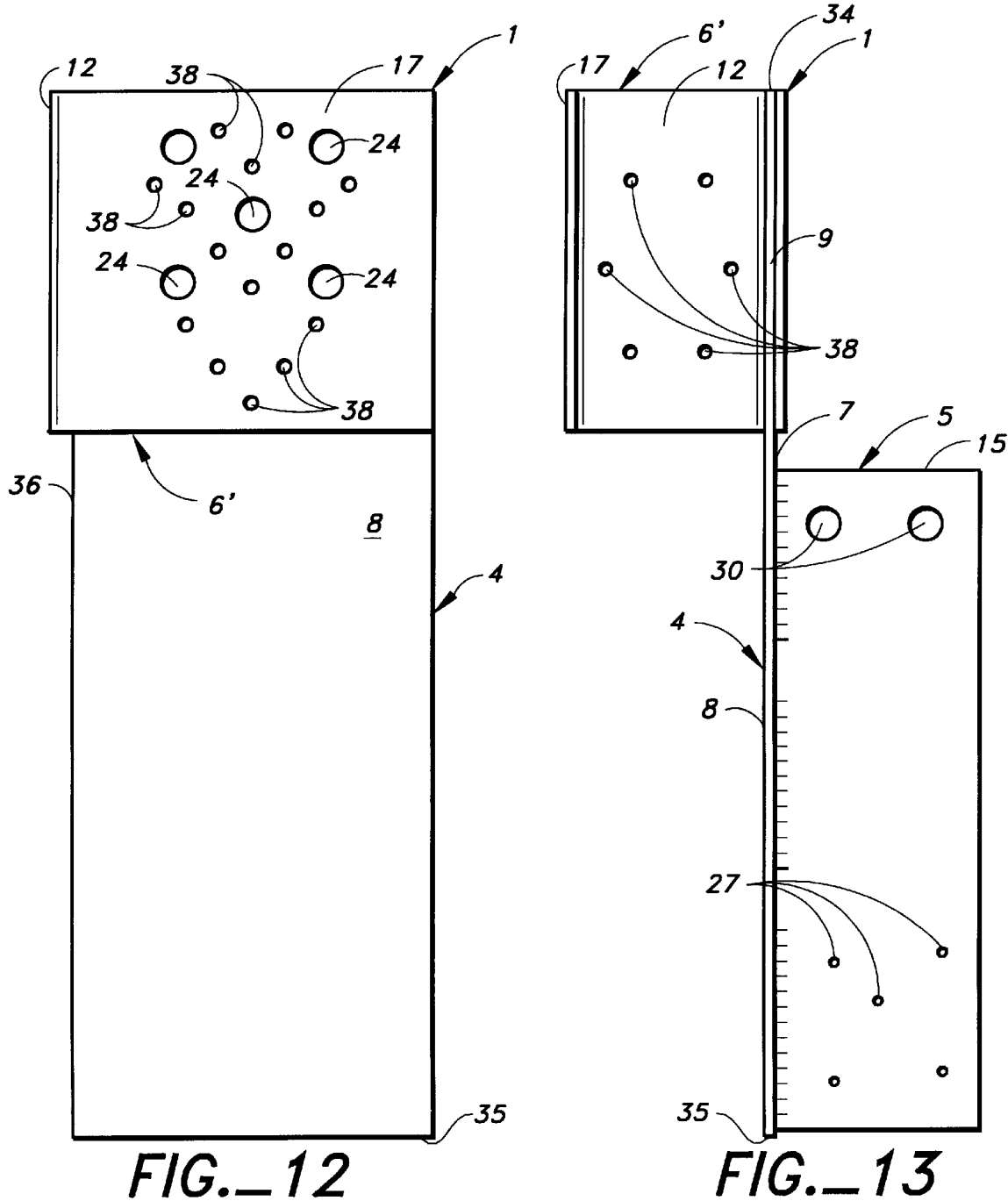

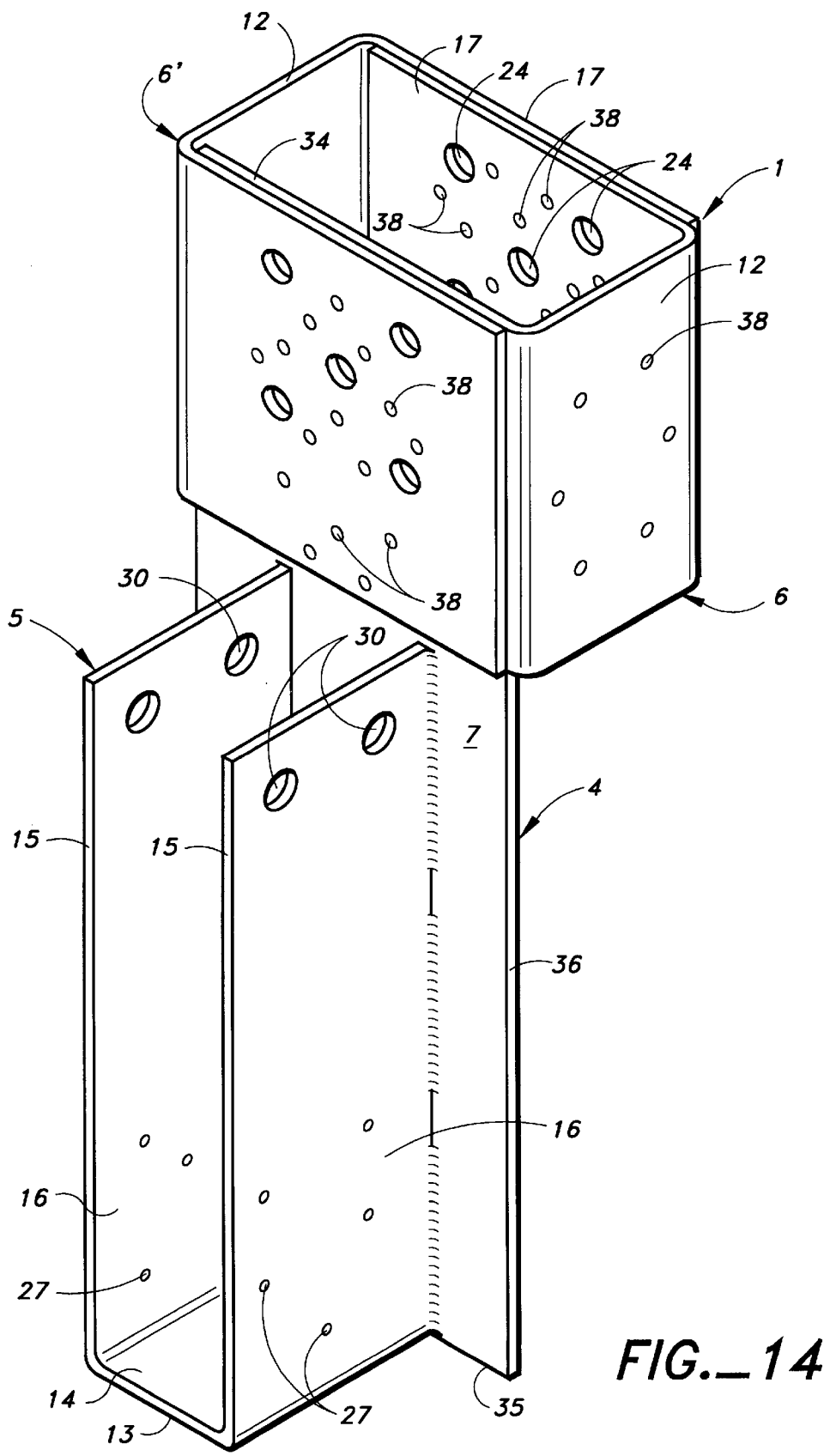
FIG._14

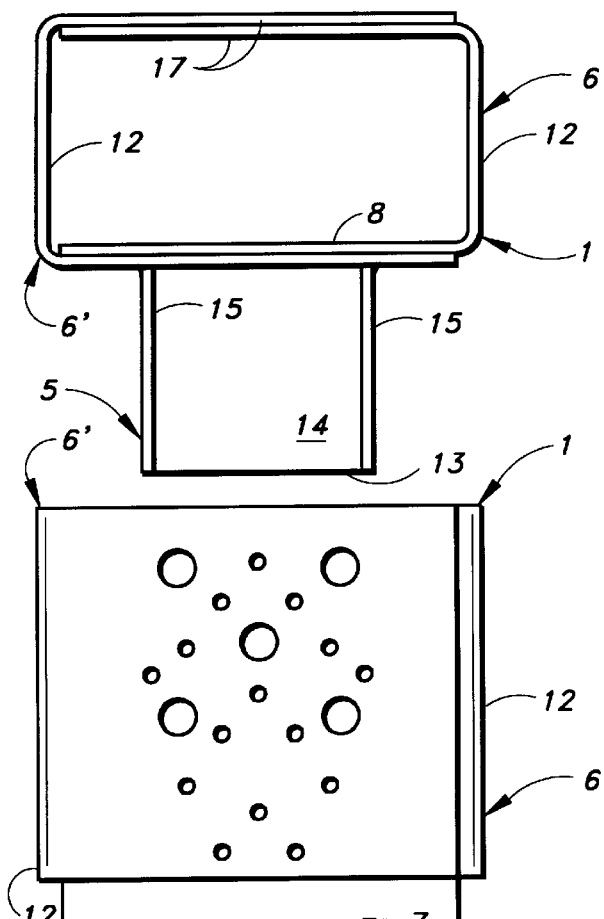
FIG._15
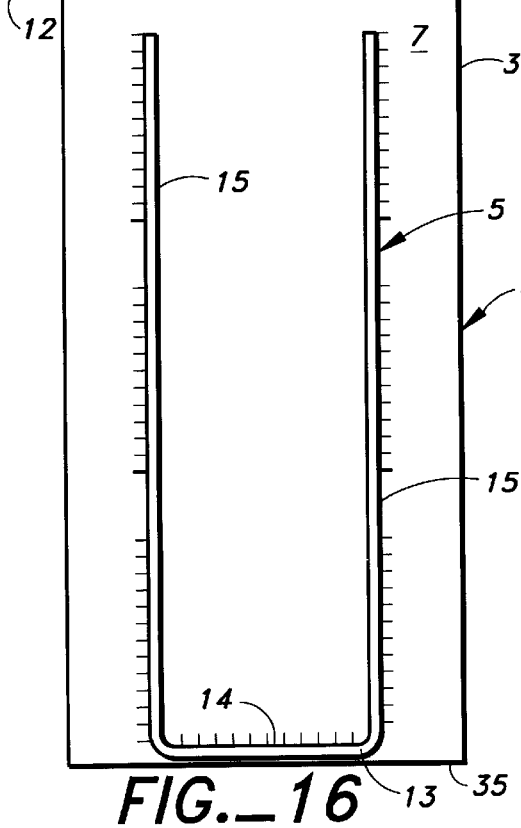
FIG._16
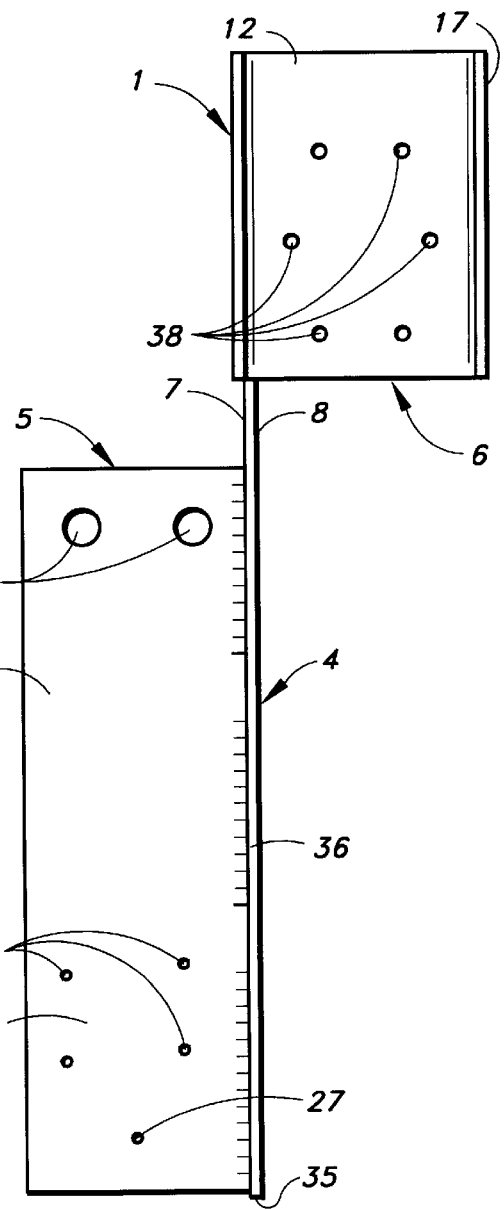
FIG._17

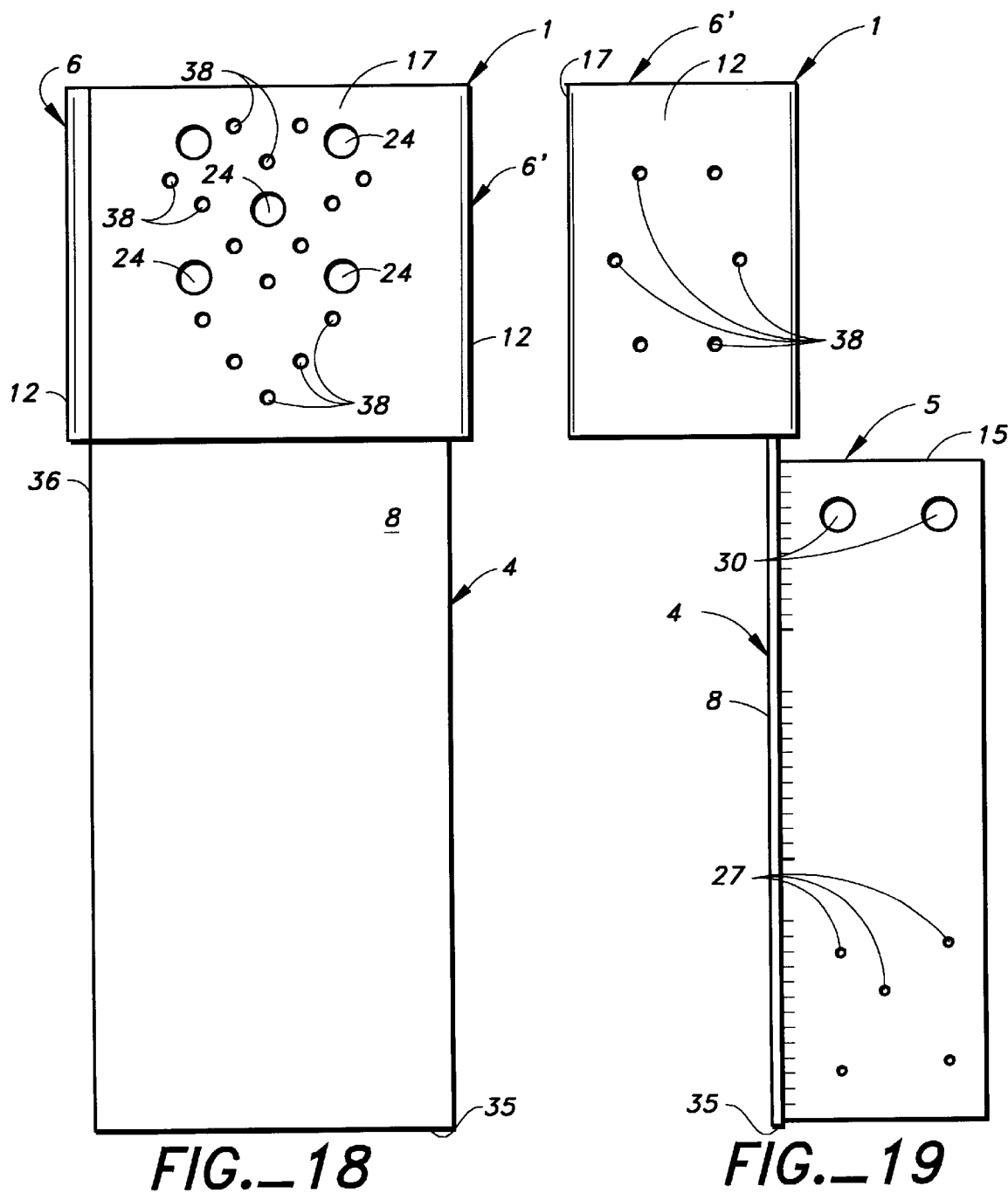
FIG.__18  FIG.__19

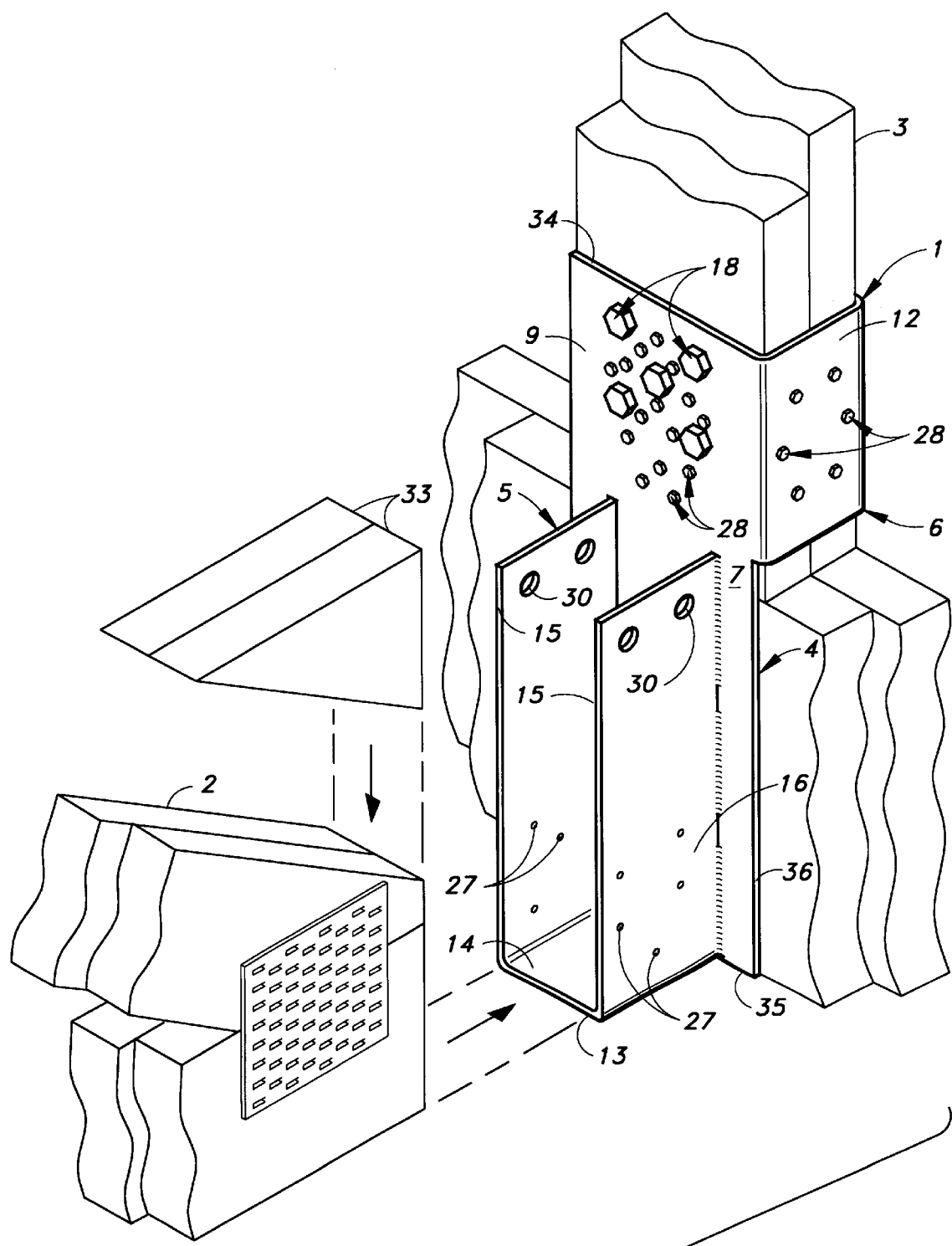
FIG._20

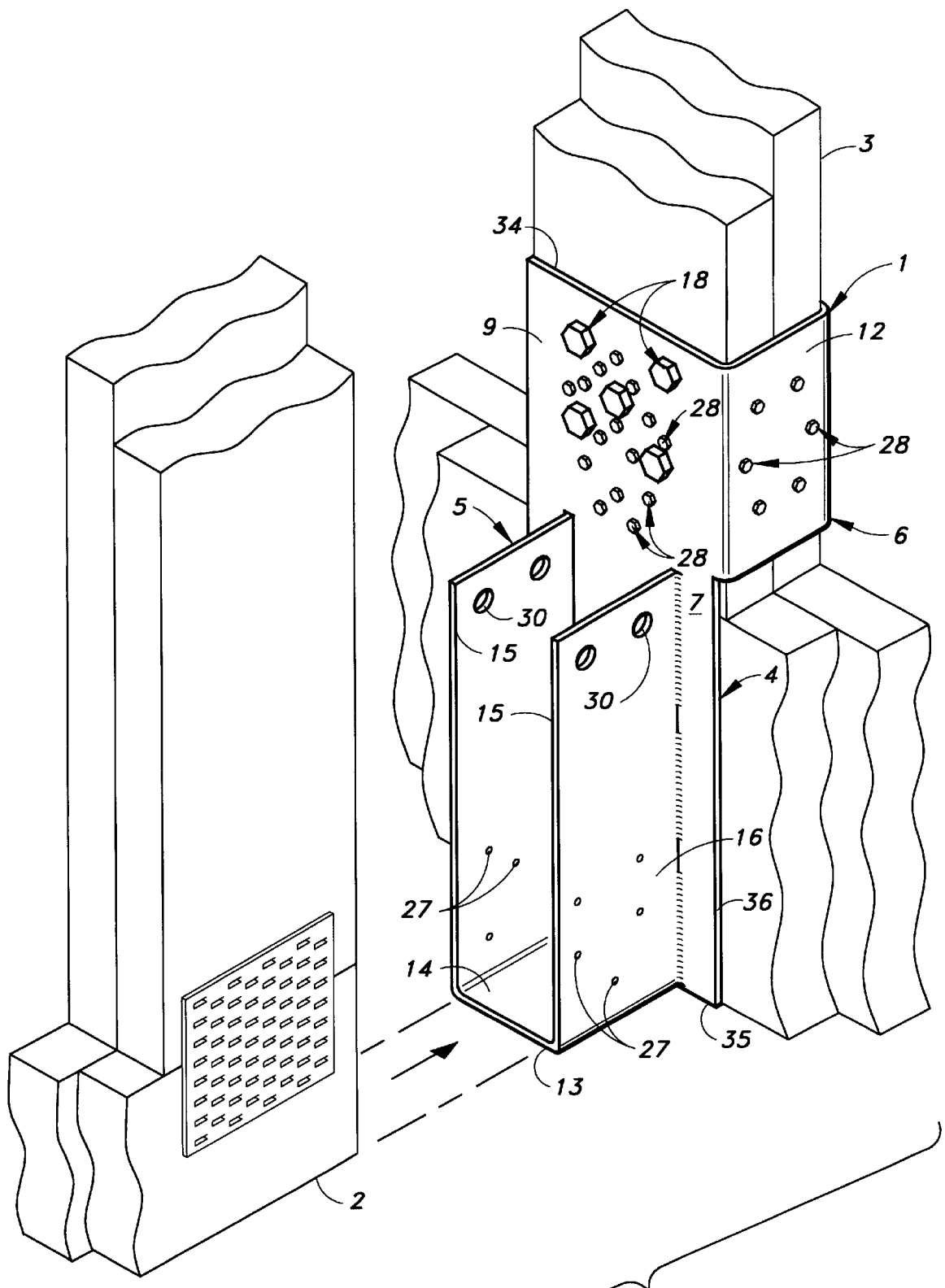
FIG._21

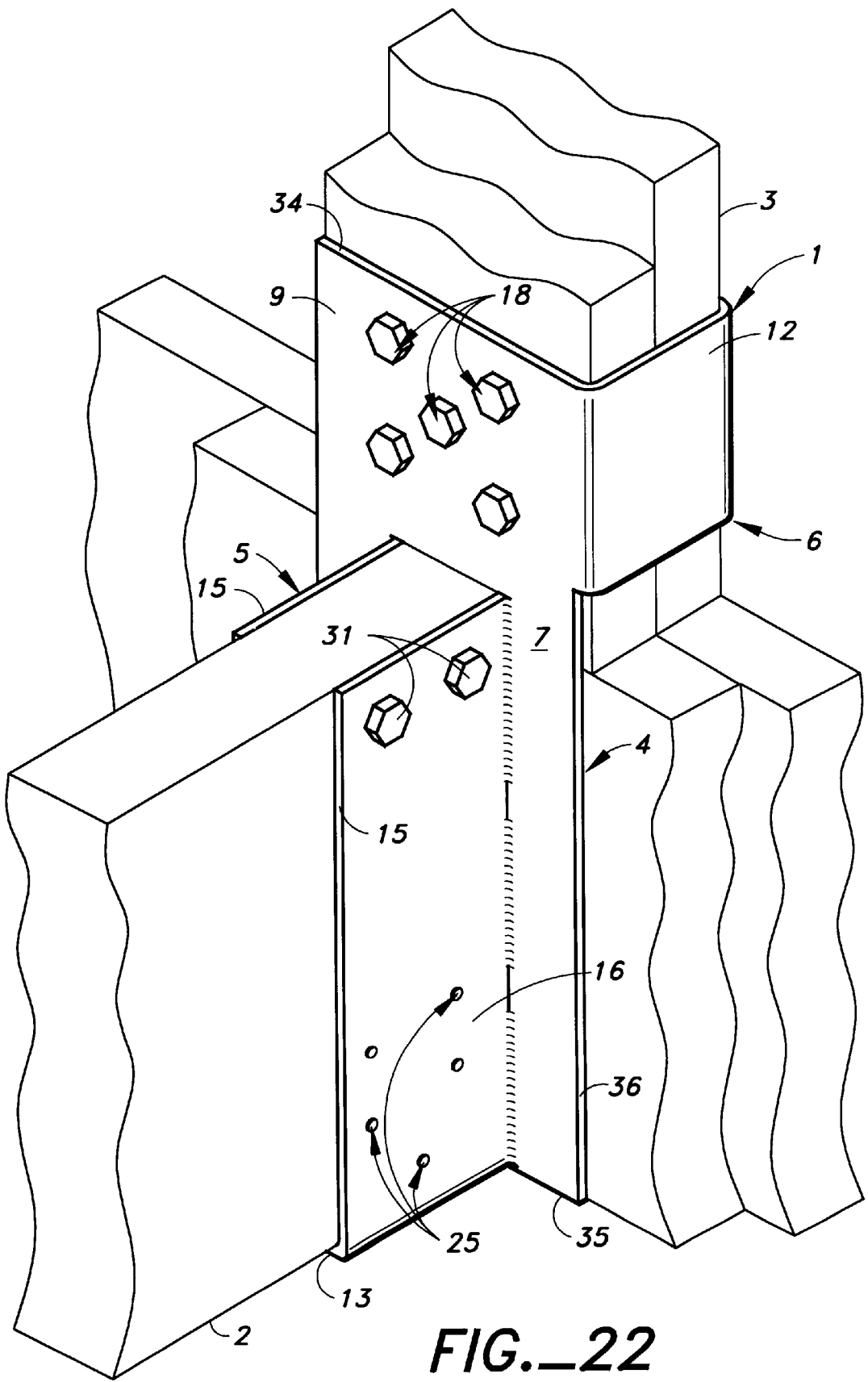
FIG._22

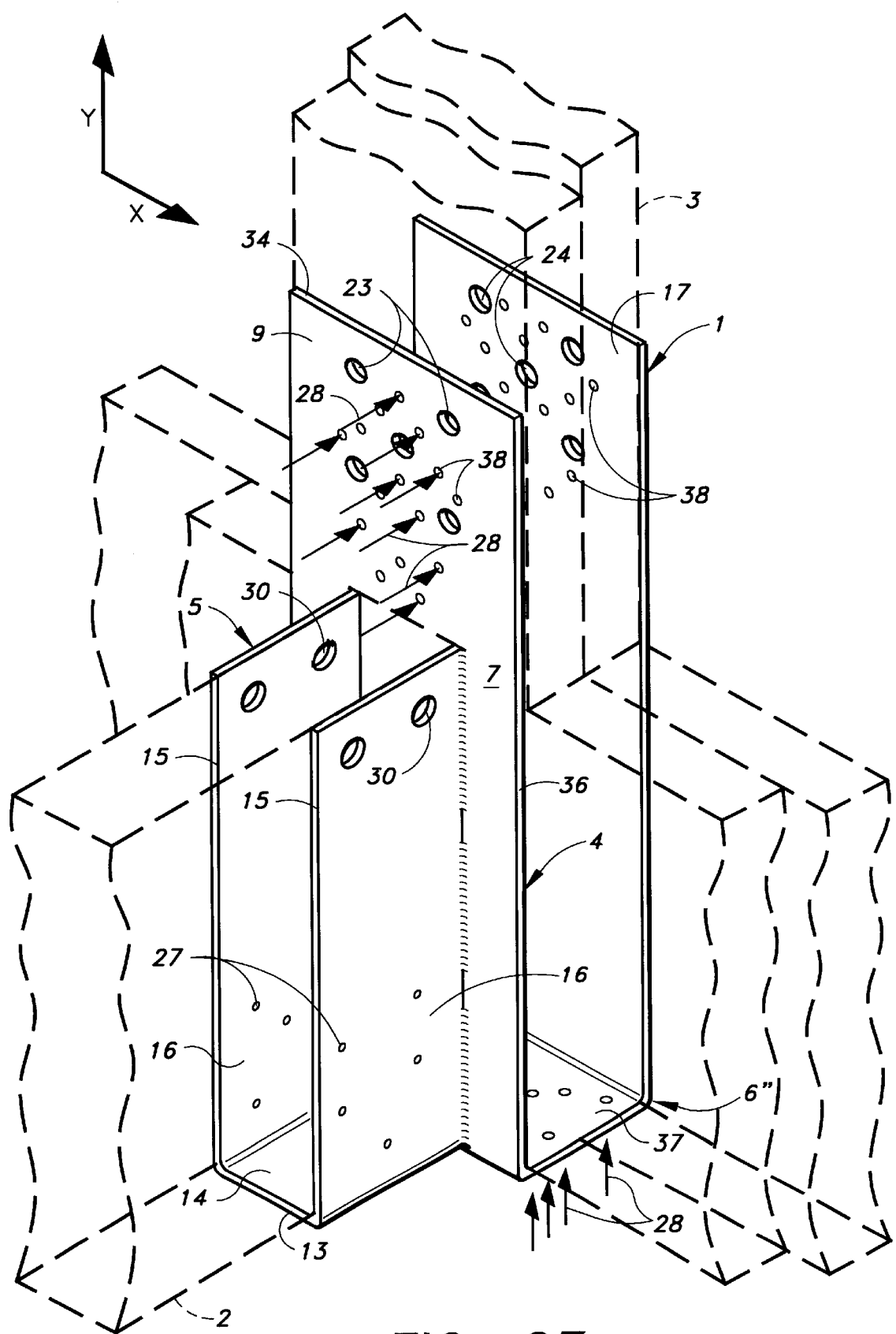
FIG._23

WRAP AROUND HANGER

BACKGROUND OF THE INVENTION

This invention relates to a connector used in building construction, and in particular to a structural hanger for suspending a held framing member from a holding framing member in a building.

Hangers typically have a stirrup-shaped portion for receiving an end portion of a held framing member, such as a joist, a top flange for connecting the hanger to the support or holding member, such as a truss or a purling, and a back member that connects the stirrup portion to the top flange.

The stirrup portion generally comprises a seat member which the held framing member rests upon, and first and second opposite side members that stabilize the held framing member. The first and second opposite side members receive the end portion of the held framing member between them. The first and second opposite side members are generally formed with a plurality of openings for allowing the hanger to be nailed or otherwise attached to the held framing member. This further stabilizes the held framing member and provides uplift resistance. For an example of a hanger with a rather unique stirrup portion see U.S. Pat. No. 4,890,436, granted to Karen W. Colonias for a Multiple Wood Truss Connection.

The stirrup portion of the typical hanger is not the only means for supporting the held member taught by the prior art. For example, some hangers eliminate the seat member. They support the held framing member by means of fasteners or bolts received by one or more side member. In these situations the bolts or fasteners provide both bearing support and uplift resistance to the held framing member. For an example of such a hanger see U.S. Pat. No. 4,893,961 granted to Kevin B. O'Sullivan and Arthur L. Troutner for a Joist Hanger.

Still other hangers vary from the typical hanger form by eliminating the top flange which connects the hanger to the holding member. See U.S. Pat. No. 4,717,279 granted to Alfred D. Commins on Jan. 5, 1988 for a Bucket Hanger. This is especially true of hangers designed for connecting two plated trusses together. See, for example, U.S. Pat. No. 5,341,619 granted to Brian D. Dunagan and Alfred D. Commins on Aug. 30, 1994 for a Truss Girder Hanger Connection, and U.S. Pat. No. 4,890,436 granted to Karen W. Colonias on Jan. 2, 1990 for a Multiple Wood Truss Connection. These hangers are generally attached to the vertical web member of the carrying truss near the bottom of the truss. Because of their location near the bottom of the vertical web member, an elongated back member would be required to provide a top flange that could hook over the top of the carrying truss.

The hanger of the present invention differs from the prior art by providing an improvement to the connection between the hanger and the carrying or holding member. The hanger of the present invention differs from the prior art, first, by providing a connection flange that does not wrap over the top of the carrying or holding member, and, second, by allowing the fasteners that make the connection to the holding member to be in double shear with the hanger.

When the carrying member is composed of multiple plies, such as in various nail-plate trusses, and the double-shear configuration is used, the present invention provides improved distribution of the load to the plies in the carrying member. This is because the hanger introduces the load to the fasteners inserted through the carrying member from two sides of the carrying member. This uniform distribution of the load makes it easier to design multiple-ply trusses so that the plies act as one member.

SUMMARY OF THE INVENTION

It is the object of the present invention to provide an improved hanger for connecting a held member to a holding member.

The present invention provides an improved connection between a held member and a holding member by having a unique connection flange that allows the hanger to be used in situations where a top flange cannot be used to connect the hanger to the holding member.

The present invention also provides an improved connection between the hanger and the holding member by creating a pair of opposed portions, both of which receive the fasteners that connect the hanger to the holding member.

The hanger of the present invention has a connection member for holding the held member, a back member, and a unique connection flange which is used to strengthen the connection of the hanger to the holding member. The connection flange can either wrap around or under the holding member. In the preferred embodiment, the connection flange wraps around the holding member to the side opposite the back member of the hanger.

This allows each of the fasteners that connect the hanger to the holding member to be received by the hanger at two points, which better distributes the load throughout the holding member.

The hanger of the present invention can be made as a single member. It can also be made with the connection flange formed as a separate "c"-shaped member that attaches to the combined back and connection members. A "c"-shaped connection flange can also be added to the single member embodiment or as an additional connection flange to the embodiment where the first connection flange is already a "c"-shaped member.

It is also to be noted that the hanger of the present invention can be used with a variety of structural members. For example, it can be used with standard dimension lumber, engineered lumber, plated wood trusses, truss girders, metal framing members, and engineered metal trusses to name a few examples.

BRIEF DESCRIPTION OF THE DRAWINGS

FIG. 1A is a perspective view of the hanger of the present invention. The longitudinal axis of the holding member connection portion is labeled "y" and the lateral axis of the holding member connection portion is labeled "x".

FIG. 1B is a perspective view of the hanger of the present invention. The hanger is shown with additional openings in the holding member connection portion and the connection flange to receive alternate fasteners. The longitudinal axis of the holding member connection portion is labeled "y" and the lateral axis of the holding member connection portion is labeled "x".

FIG. 2A is a perspective view of the hanger of the present invention in use, connecting a carried truss to the vertical web member of a carrying truss. Blocking is shown disposed between the first and second side members of the connection member.

FIG. 2B is a perspective view of the hanger of the present invention in use, connecting a carried truss to the vertical web member of a carrying truss. Blocking is shown disposed between the first and second side members of the connection member.

FIG. 3 is a top plan view of the hanger of the present invention.

FIG. 4 is a front view of the hanger of the present invention.

FIG. 5 is a left side view of the hanger of the present invention.

FIG. 6 is a back view of the hanger of the present invention.

FIG. 7 is a right side view of the hanger of the present invention.

FIG. 8 is a perspective view of a first alternate embodiment of the hanger of the present invention. Some of the fasteners used with the hanger are shown in exploded view.

FIG. 9 is top plan view of a first alternate embodiment of the hanger of the present invention.

FIG. 10 is a front view of a first alternate embodiment of the hanger of the present invention.

FIG. 11 is a left side view of a first alternate embodiment of the hanger of the present invention.

FIG. 12 is a back view of a first alternate embodiment of the hanger of the present invention.

FIG. 13 is a right side view of a first alternate embodiment of the hanger of the present invention.

FIG. 14 is a perspective view of a second alternate embodiment of the hanger of the present invention.

FIG. 15 is a top plan view of a second alternate embodiment of the hanger of the present invention.

FIG. 16 is a front view of a second alternate embodiment of the hanger of the present invention.

FIG. 17 is a left side view of a second alternate embodiment of the hanger of the present invention.

FIG. 18 is a back view of a second alternate embodiment of the hanger of the present invention.

FIG. 19 is a right side view of a second alternate embodiment of the hanger of the present invention.

FIG. 20 is a perspective view of a hanger of the present invention in use. The hanger is shown connected to the vertical web member of a carrying truss. A carried truss is shown being inserted into the connection member of the hanger. Blocking is also shown being set on top of the carried truss.

FIG. 21 is a perspective view of a hanger of the present invention in use. The hanger is shown connected to the vertical web member of a carrying truss. A carried truss is shown being inserted into the connection member of the hanger.

FIG. 22 is a perspective view of a hanger of the present invention in use. The hanger is shown connected to the vertical web member of a carrying truss. The hanger is shown carrying a typical joist.

FIG. 23 is a perspective view of a hanger of the present invention. A carrying truss and a carried joist are shown in phantom. Arrows represent fasteners inserted through the hanger of the present invention and into the carrying truss.

DESCRIPTION OF THE PREFERRED EMBODIMENT

Referring to FIG. 1A, the hanger 1 of the present invention for connecting a held member 2 to a holding member 3 has a back member 4, a connection member 5, and a connection flange 6. The back member 4 has front and back surfaces 7 and 8, and a holding member connection portion 9 that is substantially planar. The holding member connection portion 9 has a longitudinal axis "y" and a lateral axis "x" disposed orthogonal to the longitudinal axis "y". The connection member 5, which is connected to the back member 4, is disposed at an angle to the holding member connection portion 9, and extends away from the front surface 7 of the back member 4. The connection flange 6 is also connected to the back member 4. The connection flange 6 has a side portion 12 that is substantially planar and is oriented substantially in the direction of the longitudinal axis "y". The side portion 12 of the connection flange 6 is disposed at an angle to the holding member connection portion 9 and extends away from the back surface 8 of the back member 4. The side portion 12 of the connection flange 6 is also disposed substantially adjacent to the back surface 8 of the back member 4.

The connection member 5 can be formed as a seat member 13, having a top surface 14 to provide a bearing surface for the held member 2. The seat member 13 is oriented substantially in the direction of the lateral axis "x".

The connection member 5 can also be formed as a side member 15, having a substantially planar portion 16 to provide a stabilizing surface for the held member 2 and an attachment surface for the held member 2. The side member 15 is oriented substantially in the direction of the longitudinal axis "y".

Where the connection member 5 is formed as a seat member 13, the seat member 13 can be connected directly to the back member 4 or the connection member 5 can further include a side member 15 that connects the seat member 13 to the back member 4.

As shown in FIG. 1A, in the preferred embodiment, the connection member 5 includes a seat member 13 and two side members 15. The two side members 15 connect to the seat member 13 and all three connect directly to the back member 4.

As is also shown in FIG. 1A, in the preferred embodiment of the hanger 1, the connection flange 6 is formed with a back portion 17 that is substantially planar and is oriented substantially parallel to the holding member connection portion 9. The side portion 12 of the connection flange 6 connects the back portion 17 to the back member 4.

In the preferred embodiment this back portion 17 works with the holding member connection portion 9 to attach the hanger 1 to the holding member 3 by means of a first fastener 18. The first fastener 18 has a shank 19 and the shank 19 is received by both the holding member connection portion 9 and the back portion 17 of the connection flange 6. See FIG. 8. In the preferred form of the invention, this first fastener 18 is a machine bolt having a hexagonal head 20 and a threaded end 21 that receives a nut 22. See FIG. 8. The machine bolt 18 is inserted through aligned openings 23 and 24 in the holding member connection portion 9 and the back portion 17 of the connection flange 6 that are dimensioned to receive it. See FIG. 1A. In the preferred form, a plurality of machine bolts 18 are used.

In the preferred embodiment, the hanger 1 is secured to the held member 2 by means of second fasteners 25 having shanks 26 that are received by the connection member 5. See FIG. 8. In the preferred embodiment, these second fasteners 25 are nails that are driven into the held member 2 through openings 27 in the side members 15 of the connection member 5. See FIG. 1A.

The hanger 1 can also be attached to the holding member 3 by means of third fasteners 28 having shanks 29 that are received by the holding member connection portion 9. See FIG. 8. These third fasteners 28 would preferably be threaded screws that can be driven directly into the holding member 3 without requiring pre-drilled holes. The side portion 12 and the back portion 17 of the connection flange 6 could also be connected to the holding member 3 by means of threaded screws 28. See FIG. 8.

In the preferred embodiment, the side members 15 are formed with additional openings 30 for receiving fourth fasteners 31 which are also preferably machine bolts with threaded nuts 32. See FIG. 8. As is shown in FIG. 1A, these openings 30 are located near the tops of the side members 15. These fourth fasteners 31 are preferably used to secure blocking 33 to the hanger 1 which can provide additional uplift resistance when certain truss types are used as the held member 2. See FIG. 2A. These fourth fasteners 31 can also be used to support the held member 2 as shown in FIG. 22.

In the preferred embodiment the connection flange 6 is formed as an integral part of the back member 4. See FIG. 1A. Preferably, the back member 4 and connection flange 6 are formed from a single piece of 3 gauge ASTM grade steel; however, the connection flange 6 could be formed from a different plate and welded to the back member 4.

The connection flange 6' could also be formed separately from the back member as a "c"-shaped member which would be attached to the back member 4 by means of the first or third fasteners 18 or 28, during installation. See FIG. 8. Openings are formed in opposed portions of the "c"-shaped connection flange to receive the first and third fasteners 18 and 28.

Two additional embodiments are also contemplated by the inventor where a "c"-shaped connection flange 6' is used. In the first, the 'c'-shaped flange is added to the original, preferred embodiment—where the connection flange 6 is formed as an integral part of the back member 4. See FIGS. 14 through 19. In the second, a connection flange 6' is added to a hanger 1 where the connection flange 6' is already a first separate "c"-shaped member.

In the preferred embodiment, the back member 4 is formed with a top edge 34, a bottom edge 35 and a side edge 36 with the connection flange 6 extending from the side edge 36 of the back member 4.

As shown in FIG. 23, in another embodiment of the present invention, the connection flange 6" can wrap underneath the holding member 3 to which it attaches by means of a basal portion 37. The basal portion 37 is substantially planar and extends away from the back surface 8 of the back member 4. The back portion 17 of the connection flange 6", if present, connects to the basal portion 37.

In the preferred form of this embodiment, the basal portion 37 connects to the back member 4 along the bottom edge 35 of the back member 4 and a back portion 17 is present in the connection flange 6". First fasteners 18 are received by the holding member connection portion 9 of the back member 4 and the back portion of the connection flange 6". Second fasteners 25 are received by the connection member 5 to anchor the held 2 member against uplift forces.

Fabrication of the preferred hanger 1 of the present invention is as follows. Fabrication of the alternate embodiments is similar and is not repeated. A blank that will form the connection member 5 is sheared from a metal plate. The openings 27 and 30 for the second and fourth fasteners 25 and 31 are formed in the portion of the blank that will become the first and second side members 15. After the blank for the connection member 5 is cut, the piece is fed into a bending apparatus where the first side member 15 is bent up at an angle of 90 degrees from the seat member 13, and the second side member 15 is also bent up at an angle of 90 degrees.

A blank that will form the back member 4 and the connection flange 6 is also sheared from a metal plate.

Fastener openings 23 and 24 for the first fasteners 18 are formed in the portions that will become the holding member connection portion 9 and the connection flange 6. Fastener openings 38 can also be formed in the back member 4 and the connection flange 6 for the third fasteners 28. This piece is fed into a bending apparatus where the connection flange 6 is bent up from the back member 4 at an angle of 90 degrees. The side portion 12 and the back portion 17 are then formed by bending the back portion 17 up 90 degrees again from the side portion 12.

The connection member 5 is then welded to the front surface 7 of the back member 4 as shown in FIG. 1A.

As a last step, the hanger 1 is painted to protect it from the elements.

Where the connection flange 6' is formed as a separate member from the back and connection members 4 and 5, it is attached to the back member 4 during installation by means of the first or third fasteners 18 or 28.

Installation and use of the preferred embodiment is described as follows. Installation of the alternate embodiments discussed herein is similar, and is not repeated. A holding member 3 for supporting one end of the held member 2 is erected in a building structure. The other end of the held member 2 can be supported by a similar connection with the hanger 1 of the present invention or by a different connection altogether. The holding member 3 can be any one of a variety of structural framing members. The greatest need for the preferred embodiment is where a joist or a spanning truss needs to be attached to a vertical structural member such as a post, a pillar, or as shown in FIGS. 2A, 2B, 20, 21, 22 and 23 the vertical web member of a truss. If the preferred embodiment is to be supported by an elongated horizontal structural member a notch could be formed in the horizontal member to accommodate the connection flange 6, however, the engineer must bear in mind that forming such a notch in a structural member could greatly change its structural properties.

The hanger 1 of the present invention can be attached to the holding member 3 before it is erected or after it is erected. The holding member 3 is prepared by boring holes to receive threaded machine bolts 18. The openings in the holding member 3 are placed so that they will align with the openings 23 and 24 in the holding member connection portion 9 and the back portion 17 of the connection flange 6. The preferred hanger 1 is then positioned on the holding member 3, and threaded machine bolts 18 are passed through the openings 23 in the holding member connection portion 9, through the holding member 3 and through the back portion 17 of the connection flange 6. Preferably the threaded machine bolts 18 have a hexagonal head 20 that is disposed near the front surface 7 of the back member 4. Threaded nuts 22 are threaded to the threaded ends 21 of the machine bolts 18, and torqued so that the heads 20 of the machine bolts 18 sit tightly against the front surface 7 of the back member 4 and the threaded nuts 22 sit tightly against the connection flange 6.

The held member 2 is then positioned in the connection member 5 such that the held member 2 engages the bearing surface 14 of the seat member 13 and the first and second side members 15 also engage the held member 2. Nails 25 are then driven through the appropriate openings 27 in the first and second side members 15 and into the held member 2. If the held member 2 is shaped as is shown in FIG. 20, where the held member 2 does not extend up to the openings 30 in the side members 1 5, and uplift resistance is desired, then blocking 33 is cut to engage the upper portion of the held member 2 and placed between the first and second side members 15. The blocking 33 provides additional uplift resistance. Holes are bored in the blocking 33 to receive machine bolts 31 that are inserted through the openings 30 in the first and second side members 15. The machine bolts 31 are inserted through the appropriate openings in the first and second side members 15 and through the blocking 33. Preferably, the machine bolts 31 have a hexagonal head 39 and a threaded, opposite end 40. Threaded nuts 32 are attached to the threaded ends 40 of the machine bolts 31 and torqued so that the connection is tight without crushing the blocking 33.

Testing of the Present Invention

A pair of hangers were built according to the preferred single-piece embodiment of the present invention and tested in the laboratory of the assignee. See FIG. 1A. The hangers was made from 3 gauge ASTM A-570 Grade 33 steel and painted.

Each of the connection members of the hangers was formed to closely hold a carried member composed of two 1.75"×15"×18" TrusJoist MacMillan brand microlam laminated veneer lumber boards. The moisture content of the boards making up the carried member was not measured, but it is usually in the range of 12–15%. These boards were nailed together with approximately twenty 10d common nails to form the carried member. For purposes of testing the hangers two more plies of the same material were nailed to sides of the carried member in its center with eight 10d common nails on each side to reinforce it. The carried member was meant to simulate the bottom chord of a two-ply, nail-plate truss.

Each of the connection flanges of the hangers was formed to closely receive a carrying member composed of three 2"×8"×36" Douglas Fir-Larch boards nailed together. The moisture content of the boards making up each carrying members was not measured but it is usually 19–21%. The three boards were nailed together with thirty-three 10d common nails. Each carrying member was built to simulate the vertical web member of a three-ply, nail plate truss.

For testing purposes, the carrying members and the carried member were made stronger than the typical members they were designed to simulate. This was done in an attempt to isolate the failure in the testing to the hangers formed according to the present invention.

The hangers were connected to the carried member by ten 10d common nails driven through the five smaller openings in the first and second sides members of the connection members.

The hangers were connected to their carrying members with five ¾"×6" machine bolts. The machine bolts were made from A-449 Type 1 steel (Grade 5 bolt). The heads of the machine bolts were disposed on the inner sides of the carrying members against the front surface of the back members of the hangers. A-563 Grade A nuts were attached to the machine bolts and threaded on them until they clamped against the connection flanges of the hangers. No washers were used, although they could be used, if the machine bolt was long enough to allow the nut to fully engage the threads of the machine bolt.

Once the hangers were connected to the carrying members, and the carried member, the assembly was placed in the test bed of a compressive testing machine. The compressive force was applied to the middle of the carried member by a ram. Dial indicators were placed at the ends of the carried member to measure the deflection of the carried member with respect to the carrying members under the compressive load.

A preload of 10,000 pounds was applied to the carried member and then released to seat the carried member in the hangers and to establish a point of zero deflection for the carried member.

Compressive loading was then applied to the carried member at a slow rate and gauge readings were made at 4,000 pound intervals, at the first ⅛" deflection point for either side of the carried member, and at the ultimate failure point for the assembly.

At 18,730 pounds of force, the right side of the carried member deflected ⅛" from its original point.

Ultimate failure occurred at 65,870 pounds when the carried member crushed and the assembly no longer provided meaningful resistance to the compressive force applied.

I claim:

1. A hanger for connecting a held member to a holding member, comprising:
   a. a back member,
      1. said back member having front and back surfaces, and a side edge, and
      2. a holding member connection portion that is substantially planar,
      3. said holding member connection portion having a longitudinal axis, and a lateral axis disposed orthogonal to said longitudinal axis;
   b. a connection member,
      1. said connection member being disposed at an angle to said holding member connection portion,
      2. said connection member being in connection with said back member such that forces imparted to said connection member are transmitted to said back member, and
      3. said connection member extending away from said front surface of said back member;
   c. a connection flange,
      1. said connection flange having a side portion that is substantially planar,
      2. said side portion being oriented substantially in the direction of said longitudinal axis,
      3. said side portion of said connection flange being disposed at an angle to said holding member connection portion,
      4. said side portion of said connection flange extending away from said back surface of said back member,
      5. said side portion of said connection flange being disposed substantially adjacent to said back surface and said side edge of said back member,
      6. said connection flange being in connection with said back member such that forces imparted to said back member are transmitted to said connection flange, and
      7. said connection flange is formed with a back portion that is substantially planar and is oriented substantially parallel to said holding member connection portion; and
   d. one or more fasteners, said one or more fasteners each having a shank, and wherein said holding member connection portion closely receives said shank of at least one of said fasteners, forming a positive connection, and said connection flange closely receives said shank of at least one of said fasteners, forming a positive connection.

2. The hanger of claim 1, wherein:
   said connection member is a seat member,
      1. said seat member having a top surface to provide a bearing surface for said held member, and
      2. said seat member being oriented substantially in the direction of said lateral axis.

3. The hanger of claim 2, wherein:
   said seat member is directly connected to said back member.

4. The hanger of claim 2, wherein said connection member further comprises:

a side member connected to said back member and oriented substantially in the direction of said longitudinal axis, and wherein said seat member is connected directly to said side member.

5. The hanger of claim 1, wherein:

said connection member is a side member,
1. said side member having a substantially planar portion to provide a stabilizing surface for said held member and an attachment surface for said held member, and
2. said side member being oriented substantially in the direction of said longitudinal axis.

6. The hanger of claim 1, wherein:

at least one of said one or more fasteners is a first fastener having a shank, said shank being closely received by both said holding member connection portion and said back portion of said connection flange, forming a positive connection with said fastener at two points.

7. The hanger of claim 6, wherein:

said connection flange is formed as a "c"-shaped member separate from said back member and is connected to said back member by means of said first fastener.

8. The hanger of claim 1, further comprising:

a second fastener having a shank, said shank being received by said connection member.

9. The hanger of claim 1, wherein:

at least one of said one or more fasteners is a third fastener having a shank, said shank being closely received by said holding member connection portion, creating a positive connection.

10. The hanger of claim 9, wherein:

said connection flange is formed as a "c"-shaped member separate from said back member and is connected to said back member by means of said third fastener.

11. The hanger of claim 1, wherein:

at least one of said one or more fasteners is a third fastener having a shank, said shank being closely received by said side portion of said connection flange, creating a positive connection.

12. The hanger of claim 1, further comprising:

a fourth fastener having a shank, said shank being received by said connection member.

13. The hanger of claim 1, wherein:

said connection flange is integrally connected to said back member.

14. The hanger of claim 13, further comprising:

an additional connection flange formed as a "c"-shaped member and attached to said back member by means of said first fastener.

15. The hanger of claim 1, wherein:

said hanger is connected to a holding member and supports a held member, and said shanks of said one or more fasteners do not enter said held member.

16. The hanger of claim 1, wherein:

said hanger connects horizontally disposed trusses.

17. A hanger for connecting a held member to a holding member comprising:

a. a back member,
  1. said back member having front and back surfaces,
  2. a holding member connection portion that is substantially planar, and
  3. said holding member connection portion having a longitudinal axis, and a lateral axis disposed orthogonal to said longitudinal axis;
b. a connection member,
  1. said connection member being disposed at an angle to said substantially planar holding member connection portion,
  2. said connection member being in connection with said back member such that forces imparted to said connection member are transmitted to said back member, and
  3. said connection member extending away from said front surface of said back member, and
  4. said connection member has a side member that is oriented substantially in the direction of said longitudinal axis;
c. a connection flange,
  1. said connection flange having a back portion that is substantially planar,
  2. said back portion being oriented substantially parallel to said holding member connection portion, and
  3. said connection flange being in connection with said back member such that forces imparted to said back member are transmitted to said connection flange and said back portion; and
d. a first fastener having a shank, said shank being closely received by both said holding member connection portion and said back portion of said connection flange, forming a positive connection with said fastener at two points.

18. The hanger of claim 17, further comprising:

a second fastener having a shank, said shank being received by said connection member.

19. The hanger of claim 17, wherein:

said connection member further comprises a seat member,
1. said seat member having a top surface to provide a bearing surface for said held member, and
2. said seat member being oriented substantially in the direction of said lateral axis.

20. The hanger of claim 17, wherein:

said connection flange is integrally connected to said back member.

21. The hanger of claim 20, further comprising:

an additional connection flange formed as a "c"-shaped member and attached to said back member by means of said first fastener.

22. The hanger of claim 17, wherein:

said connection flange is formed as a "c"-shaped member separate from said back member and is connected to said back member by means of said first fastener.

23. The hanger of claim 17, wherein:

said hanger is connected to a holding member by means of said first fastener and said holding member carries a held member that is connected to said hanger by said connection member, and said shank of said first fastener does not enter said held member.

24. The hanger of claim 17, wherein:

said hanger connects horizontally disposed trusses.

* * * * *